(12) United States Patent
Hilsebecher et al.

(10) Patent No.: US 7,786,926 B2
(45) Date of Patent: Aug. 31, 2010

(54) RADAR SYSTEM FOR MOTOR VEHICLES

(75) Inventors: Joerg Hilsebecher, Hildesheim (DE);
Herbert Olbrich, Rutesheim (DE);
Thorsten Sohnke, Liederbach (DE);
Alfred Kuttenberger, Herrenberg (DE);
Marc Theisen, Besigheim (DE); Martin Randler, Immenstaad (DE); Michael Bunse, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 11/884,560

(22) PCT Filed: Feb. 8, 2006

(86) PCT No.: PCT/EP2006/050769

§ 371 (c)(1),
(2), (4) Date: Apr. 4, 2008

(87) PCT Pub. No.: WO2006/089841

PCT Pub. Date: Aug. 31, 2006

(65) Prior Publication Data

US 2008/0291078 A1    Nov. 27, 2008

(30) Foreign Application Priority Data

Feb. 25, 2005    (DE) .................. 10 2005 008 715

(51) Int. Cl.
*G01S 13/00*    (2006.01)

(52) U.S. Cl. .................. 342/72; 342/104; 342/109; 342/118

(58) Field of Classification Search .................. 342/70, 342/72, 104–118
See application file for complete search history.

(56) References Cited

U.S. PATENT DOCUMENTS

| 4,642,641 A | * | 2/1987 | Campbell ............ 342/88 |
| 5,872,536 A | | 2/1999 | Lyons et al. |
| 6,043,773 A | * | 3/2000 | Watanabe ............ 342/71 |
| 6,434,506 B1 | * | 8/2002 | Eckersten et al. ........ 702/142 |
| 2001/0044696 A1 | * | 11/2001 | Saitou et al. ............ 701/213 |
| 2003/0051530 A1 | * | 3/2003 | Eisele et al. ............ 73/12.09 |

FOREIGN PATENT DOCUMENTS

| DE | 103 50 553 | 6/2005 |
| WO | 2004/061471 | 7/2004 |

* cited by examiner

*Primary Examiner*—Thomas H Tarcza
*Assistant Examiner*—Timothy A Brainard
(74) *Attorney, Agent, or Firm*—Kenyon & Kenyon LLP

(57) ABSTRACT

A radar system for motor vehicles, having a radar sensor and an evaluation device for measuring distances and relative velocities of objects in the surrounding field of the vehicle, and a collision detection device, which, on the basis of the measured distances and relative velocities, recognizes an imminent collision and delivers data on the expected time of collision and the impact velocity to a precrash system. The radar sensor is switchable by the collision detection device to a velocity measurement mode in which a more precise measurement of the relative velocity is made.

7 Claims, 2 Drawing Sheets

RADAR SYSTEM FOR MOTOR VEHICLES

FIELD OF THE INVENTION

The present invention relates to a radar system for motor vehicles, having a radar sensor and an evaluation device for measuring distances and relative velocities of objects in the surrounding field of the vehicle, and a collision detection device, which, on the basis of the measured distances and relative velocities, recognizes an imminent collision and delivers data on the expected time of collision and the impact velocity to a precrash system.

BACKGROUND INFORMATION

A radar system of this kind is typically used in connection with an adaptive cruise control (ACC), which automatically adjusts the velocity of the host vehicle to the velocity of a preceding vehicle, to ensure that this preceding vehicle is followed at an appropriate collision-avoidance distance.

In an FMCW (frequency modulated continuous wave) radar commonly used for these purposes, the frequency of the transmitted radar signal is periodically modulated using different ramp slopes, and the radar signal reflected off of one or a plurality of objects is mixed with the transmitted signal, so that an intermediate frequency signal is obtained whose frequency corresponds to the frequency differential between the transmitted and the received signal.

A spectrum of the intermediate frequency signal is recorded in each measuring cycle through the use of an appropriate algorithm, such as the Fast Fourier Transform (FFT). In this spectrum, each located object is manifested as a peak at a specific frequency. The frequency at the peak location is dependent, on the one hand, on the ramp slope and on the object distance and, on the other hand, on the relative velocity of the object.

By comparing the peaks belonging to the same object measured at two different ramp slopes, the distance- and velocity-dependent frequency components are able to be separated, so that measurement data on the distance and the relative velocity of the object are obtained. The assumption in this context is that, ideally, the relative velocity remains virtually unchanged for the duration of the two ramps.

In the case of a plurality of objects, it is possible to eliminate any ambiguities that arise when assigning the peaks to the objects by evaluating at least one additional frequency ramp.

Since this evaluation procedure entails considerable computational outlay, a certain minimum duration is required for one single measuring cycle, so that the measurement data obtained are limited in terms of accuracy and temporal resolution.

In addition, so-called precrash systems are known, which are used for activating passive, reversible safety systems of the vehicle, such as reversible airbags, seat-belt tensioners and the like, in sufficient time, before an imminent impact when, on the basis of the radar data, the collision device recognizes a situation in which a collision can no longer be averted. Moreover, precrash systems are known which are used, inter alia, for determining an optimal firing point, for example, for a pyrotechnically actuated airbag or seat-belt tensioner. This requires a most accurate possible knowledge of the expected time of collision, as well as of the relative velocity at the time of collision, thus of the impact velocity.

SUMMARY OF THE INVENTION

The exemplary embodiment and/or the exemplary method of the present invention having the features described herein advantageously enables a more precise determination of the impact velocity to be made, making it possible for the function of the precrash system to be optimized particularly with regard to the impact velocity.

This is achieved in accordance with the exemplary embodiment and/or the exemplary method of the present invention in that the radar sensor is switchable by the collision detection device to a velocity measurement mode in which a more precise measurement of the relative velocity is made.

The exemplary embodiment and/or the exemplary method of the present invention is based on the consideration that the above described method for evaluating radar signals is not optimal in the case of a collision that can no longer be averted. On the one hand, in such a situation, it is already only the location-detection data on the collision object that are relevant, so that it is inexpedient to track the data on the other objects. On the other hand, the radar sensor, typically an LLR (long range radar), is designed for measuring relatively long object distances that are not significantly shorter than the collision-avoidance distances that arise in a normal traffic situation. For that reason, as the collision object get progressively closer, the distance data become increasingly unreliable and ultimately useless. Moreover, it is generally assumed that, just prior to a collision, the relative velocity is subject to highly dynamic conditions, because the host vehicle is typically heavily braked. Therefore, the assumption that the relative velocity of the object remains the same during two consecutive frequency ramps no longer holds unconditionally, so that even the accuracy of the velocity measurement is degraded.

Therefore, in the case of an imminent collision, the exemplary embodiment and/or the exemplary method of the present invention provides for the switch to be made to a different measurement mode that is specifically configured for a more precise measurement of the relative velocity. In this context, it is possible to limit the evaluation to the collision object and to dispense with collecting distance data, so that the evaluation procedure may be substantially simplified and, accordingly, the cycle time shortened, thereby achieving a higher temporal resolution in the velocity measurement. In this manner, it is possible to measure the relative velocity of the collision object more precisely and to track the same virtually up to the time of collision, so that the estimated value for the impact velocity obtained during the regular measurement mode of the radar sensor may be corrected and defined more precisely.

In the velocity measurement mode, the need for modulating the frequency of the transmitted radar signal is eliminated, and a pure Doppler measurement of the relative velocity of the collision object is taken. This substantially simplifies the evaluation and considerably reduces the cycle time, while a high level of precision is maintained for the relative velocity measurement.

By integrating the relative velocity data recorded in the velocity measurement mode, the temporal change in the distance may also continue to be tracked, making it possible to further improve the estimated value for the time of collision.

DETAILED DESCRIPTION

Figure 1:
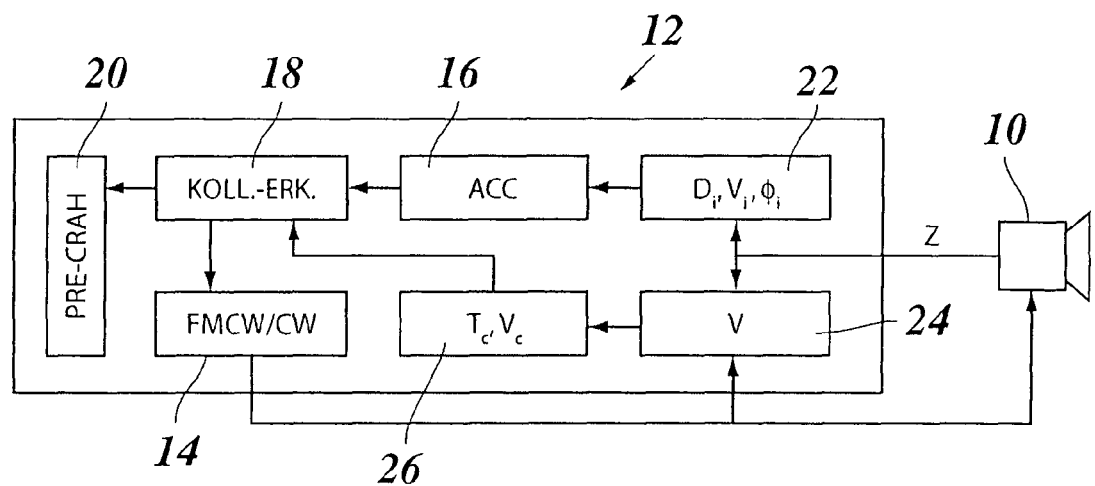
FIG. 1 shows a block diagram of a radar system according to the exemplary embodiment and/or the exemplary method of the present invention.

The radar system shown in FIG. 1 includes a radar sensor 10, for example a 77 GHz long-range radar, that is installed in the front part of the motor vehicle, and a corresponding electronic evaluation device 12, made up, for example, of one or more microprocessors, corresponding program memories and data memories, and the like. Evaluation device 12 also includes a driver 14 for controlling radar sensor 10. This driver is switchable between two operating modes FMCW und CW, as will be clarified later in greater detail. In the illustrated example, other components of evaluation device 12 include an ACC module 16, a collision detection device 18, and a precrash system 20.

In normal operation, the ACC module is active, and radar sensor 10 is operated in the FMCW mode. In a manner known per se, in radar sensor 10, the transmitted radar signal is mixed with the radar signal that is reflected off of various objects, for example off of preceding vehicles, and received by the radar sensor, to form an intermediate frequency signal Z, which is evaluated in a processing stage 22 to determine distances $D_i$ and relative velocity $V_i$ of the located objects. Typically, radar sensor 10 also has a certain angular resolution, and it delivers intermediate frequency signals Z for a plurality of channels which differ in their transmitting and receiving direction, so that, by evaluating the intermediate frequency signals from the different channels, it is also possible to determine azimuth angle $\Phi i$ of the located objects. On the basis of these data, ACC module 16 recognizes which objects are located in the same lane as the host vehicle, and, among these, it selects that object which is closest to the host vehicle, as the target for an automatic distance control. By intervening in the drive system and, if necessary, in the brake system of the vehicle as well, ACC module 16 controls the velocity of the host vehicle so that the target is followed at an appropriate collision-avoidance distance.

Collision detection device 18 tracks the distance data and the relative velocity data of the target and, on the basis of the known maximum decelerating power of the host vehicle, decides whether or not it is possible to avoid a collision with the target. When a collision can no longer be avoided, for example because the target became involved in an accident and has suddenly come to a standstill, collision detection device 18 outputs a collision warning to the driver. Depending on the specific embodiment, an emergency braking may also be optionally automatically initiated. Moreover, by extrapolating the distance data and the relative velocity data, taking into account the expected deceleration of the host vehicle, the collision detection device computes the expected time of collision, as well as the impact velocity, i.e., the relative velocity up to the time of collision. These data are output to precrash system 20, which, on this basis, makes a decision to activate the reversible restraint system, for example, or also by taking into account the acceleration data following contact with the collision object, computes the optimal firing points for airbag systems of the vehicle, in order to protect the vehicle occupants as effectively as possible from the consequences of a collision.

Collision detection device 18 may, in fact, continue to track the distance data and the relative velocity data of the target even after an unavoidable collision situation is recognized, in order to obtain more precise prediction values for the time of collision and the impact velocity. However, after a certain point in time, this is no longer expedient, because, with decreasing distance to the collision object, the distance data become increasingly uncertain, and the temporal resolution obtained when tracking the relative velocity data is also too imprecise.

For that reason, at an appropriate point in time, collision detection device 18 outputs a switchover signal to driver 14, which then switches radar sensor 10 to a velocity measurement mode CW, to make possible a more precise and more highly temporally resolved measurement of the relative velocity. Intermediate frequency signal Z is then no longer evaluated by processing stage 22, but rather by a processing stage 24, in which solely the relative velocity of the collision object is determined. In this manner, continued tracking of the relative velocity is possible at a high temporal resolution and high precision, so that more precise prediction values for time of collision $T_c$ and impact velocity $V_c$ may be computed in a calculation module 26 and output via collision detection device 18 to precrash system 20.

Figure 2:
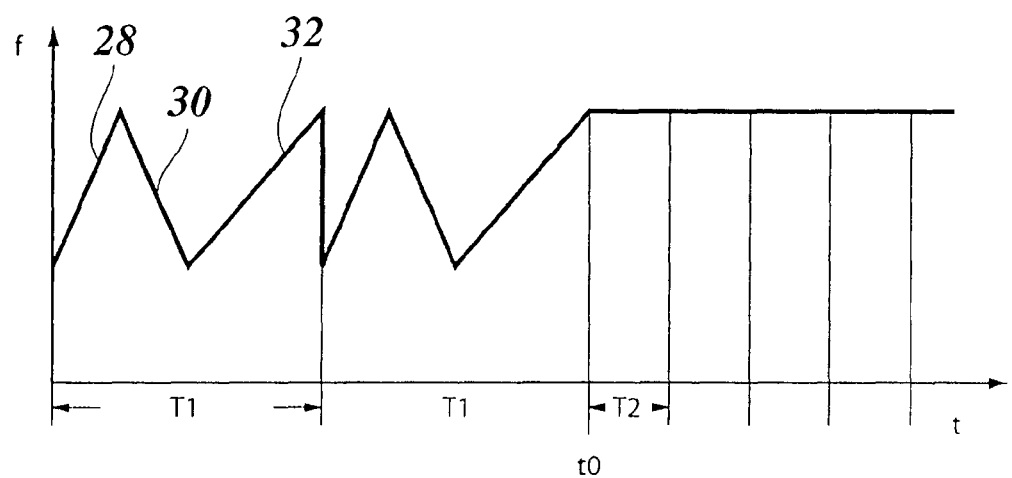
FIG. 2 shows a frequency/time diagram of a transmitted radar signal.

The principle of operation of processing stages 22 and 24 is described below in greater detail with reference to FIG. 2. FIG. 2 illustrates the temporal change in frequency f of the radar signal transmitted by radar sensor 10. For as long as the radar sensor is in the FMCW mode, this frequency is ramp modulated, producing a rising ramp 28, a ramp 30 falling symmetrically thereto, and a ramp 32 rising with a flatter curve slope.

This modulation pattern is periodically repeated in each case following one cycle time T1. The frequency of intermediate frequency signal Z corresponds in each instance to the difference between the transmitted and the received frequency. Within each of the three ramps 28, 30, 32, intermediate frequency signal Z is digitized during a defined sample period and its time characteristic is recorded. A fast Fourier transform (FFT) is performed to produce the frequency spectrum. Every object located in the detection region of radar sensor 10 is manifested in this spectrum as a peak (frequency maximum) at a specific frequency. Due to the modulation of transmitted frequency f, the frequency at which the peak for a specific object lies is cumulatively composed of a relative velocity-dependent component, which is the same for all ramps, and of a distance-dependent component, which is proportional to the distance of the object and to the ramp slope. Since the slopes of ramps 28, 30 are equal-but-opposite, the distance-dependent components cancel each other out when the frequencies of the peaks obtained for the same object on both ramps are added. The relative velocity of the object may then be computed from the sum. On the other hand, if the frequencies of the two peaks are subtracted to obtain the difference, the velocity dependent-component is eliminated, and the distance of the object may be computed from the difference obtained.

The above-described separation of the distance-dependent and velocity-dependent components is based on the assumption that the relative velocity of the object is virtually unchanged for the duration of ramps 28, 30. However, in the case of a full braking of the host vehicle, as typically occurs prior to a collision, this assumption is not or is only partially warranted.

Moreover, when a position is simultaneously fixed on a plurality of objects, the above described procedure presupposes that it is known which peak belongs to which object and how the peaks obtained on various ramps belong together. This information is able to be obtained by evaluating the position of the peaks on third ramp 32. The procedure required for this purpose is known per se and will not be further discussed here. It is only of interest here insofar as it leads to a considerable increase in computational outlay. This applies correspondingly to the determination of azimuth angle Φi, which likewise will not be further discussed here.

All of the processing procedures described above must be completed within cycle time T1. From this, it follows that the cycle time cannot be arbitrarily reduced, and thus the temporal resolution of the measurements cannot be arbitrarily increased.

In the case of an imminent collision with an obstacle, i.e., the collision object, the received radar echo originates predominantly from the collision object or virtually exclusively therefrom. As the collision object gets progressively closer, the distance-dependent frequency component tends to 0. However, since only a limited measuring time is available for measuring this frequency component, the accuracy of the frequency measurement and thus the accuracy of the distance determination diminish. On the other hand, the amplitude of the radar echo received from the collision object increases considerably with increasing distance, and increased shadowing effects result for all of the remaining objects, so that the received radar signal is now composed virtually of just the signal from the collision object.

Therefore, at an appropriate point in time t0, collision detection device 18 prompts driver 14 to switch radar sensor 10 to velocity measurement mode CW. In this mode, transmitted frequency f is no longer modulated, but is kept at a constant level. This means that the radar sensor is now operated as a pure Doppler radar. The evaluation of intermediate frequency signal Z, whose frequency now corresponds to the Doppler shift of the signal from the collision object, takes place in processing stage 24. Since there is no longer a need for a plurality of frequency ramps to be modulated within one single measuring cycle, the cycle time may be significantly reduced (to T2). Moreover, the computational outlay entailed in evaluating the intermediate frequency signal is simplified, since distance computations are no longer made and there is no longer a need to differentiate among various objects.

For example, in this case, the measuring duration within one single measuring cycle is now merely about 2.2 ms, and, in consideration of the computing time for the evaluation, the cycle time is able to be reduced to less than 10 ms, so that the progression of the relative velocity over time is only able to be tracked at a high resolution. In this context, within the measuring time of 2.2 ms, 1024 sample cycles may be carried out, for example, in each instance with a duration of about 2.2 μs, and, by determining the Doppler frequency (by FFT), the relative velocity is able to be determined at an error rate of less than 0.06 m/s. In this context, the measuring range is, for example, 0.2 to 60 m/s, and the velocity measurement may be continued up to arbitrarily small object distances, thus virtually up to the time of collision, so that the last velocity measurement is taken less than 10 ms prior to the collision. In this manner, the impact velocity is able to be determined very precisely, so that precrash system 20 may be configured accordingly.

When the evaluation is performed in parallel in the various channels assigned to different transmitting and receiving directions, directional information is still obtainable on the basis of the amplitude ratios, making it possible to localize the expected impact location. The relative velocity measured on the basis of the Doppler effect is the relative velocity along the line of collimation from the radar sensor to the center of reflection on the collision object. However, in the case of an off-center impact and at small distances, the direction of this line of collimation may deviate considerably from the actual impact direction, so that the measured relative velocity also deviates from the actual impact velocity. This deviation is able to be corrected mathematically on the basis of the directional information.

If, on the other hand, for instance in the case of an on-center impact, the evaluation of the directional information is dispensed with, the available channels are able to be utilized correspondingly more often to compute the relative velocity, making it possible to further reduce the cycle time and thus further enhance the resolution.

Figure 3:
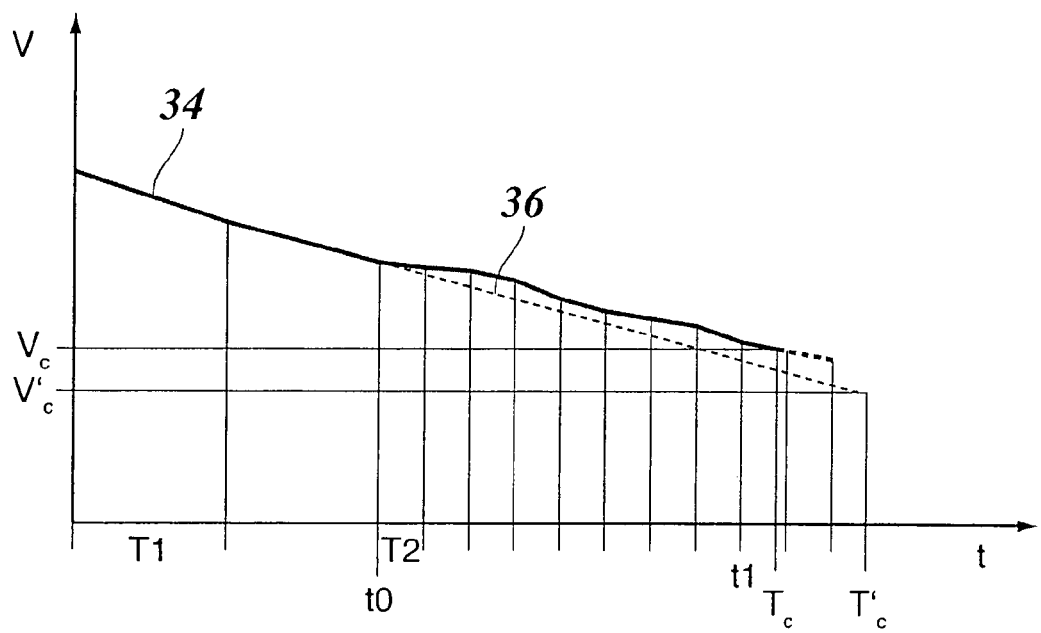
FIG. 3 shows a velocity/time diagram for clarifying the principle of operation of the radar system.
Figure 4:
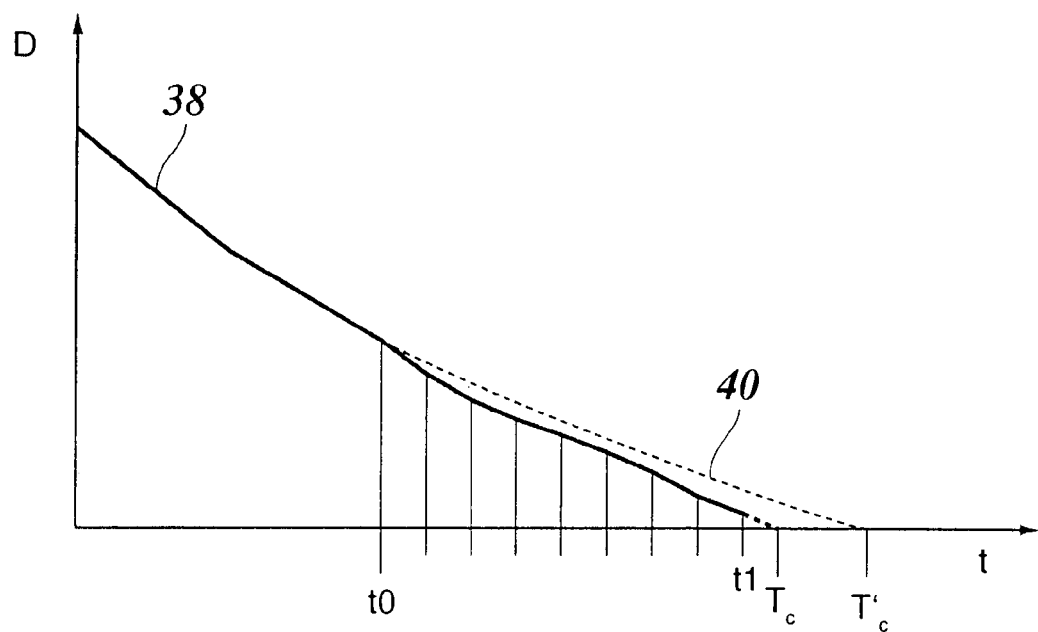
FIG. 4 shows a distance/time diagram for clarifying the principle of operation of the radar system.

FIGS. 3 and 4 show exemplarily how the progression over time of relative velocity V and of distance D to the collision object is tracked. It is assumed exemplarily that the host vehicle is heading toward a stationary obstacle, so that relative velocity V (FIG. 3) corresponds in terms of absolute value to the absolute velocity of the host vehicle. Up to point in time t0, this relative velocity V is determined with the aid of processing stage 22 in intervals which correspond to cycle time T1. The decrease in velocity illustrated by curve 34 in FIG. 3 corresponds to the deceleration of the host vehicle initiated by the driver or automatically triggered by collision detection device 18. On the basis of the approximately known decelerating performance of the vehicle, this curve is able to be extrapolated into the future, as indicated in FIG. 3 by a dashed line 36. In practice, however, this extrapolation is fraught with considerable uncertainties, because various factors, such as an icy pavement condition, may influence the actual deceleration of the host vehicle and because, generally, in the case of an impact with an obstacle that is not stationary, the relative velocity is also dependent on the unpredictable change in the absolute velocity of the collision object.

Curve 38 in FIG. 4 illustrates the corresponding time characteristic of distance D, which may be directly measured up to point in time t0 and, subsequently thereto, may be estimated by integrating the extrapolated relative velocity (curve 36), as indicated by dashed line 40 in FIG. 4. The point of intersection of this line 40 with the t-axis (D=0) yields an estimated value $T'_c$ for the time of collision. On the basis of curve 36 in FIG. 3, a corresponding estimated value $V'_c$ for the impact velocity is then able to be read off.

From point in time t0 on, radar sensor 10 is in the velocity measurement mode, and relative velocity V is now measured more precisely and at a higher resolution, commensurately with shorter cycle time T2. As the shape of curve 34 drawn in bold face in FIG. 3 shows, the decrease in relative velocity V is less pronounced than expected in this example, so that the actual relative velocity remains greater than the extrapolated velocity indicated by curve 36. The actual characteristic of the relative velocity is now able to be tracked at a high temporal resolution virtually up to actual time of collision $T_c$. The last velocity measurement takes place at a point in time t1 which is less than 10 ms before the time of collision. By integrating measured relative velocity V, curve 38 in FIG. 4, which indicates the distance to the collision object, is able to be extrapolated beyond point in time t0. This makes possible an increasingly more precise prediction of true time of collision $T_c$. In the last velocity measurement at point in time t1, less than 10 ms are merely still needed to extrapolate the relative velocity and the distance into the future to obtain precise time of collision $T_c$. On the basis of curve 34 in FIG. 3, it is possible then to determine an even more precise value for impact velocity $V_c$. This permits a substantially better adaptation of the configuration of precrash system 20 to the actual conditions.

What is claimed is:

1. A radar system for motor vehicles, comprising:
   a radar sensor configured to generate, in a normal operating mode, distance-dependent data and relative-velocity-dependent data, and further configured to generate, in a velocity measurement mode, more precise relative-velocity-dependent data;
   an evaluation device configured to measure a distance from a vehicle to an object in a surrounding field of the vehicle based on the distance-dependent data, and to measure the relative velocity of the object based on either of the relative-velocity-dependent data and the more precise relative-velocity-dependent data; and
   a collision detection device, which, based on measured distances and measured relative velocities, recognizes an imminent collision and delivers data on an expected time of collision and an expected impact velocity to a precrash system, wherein the radar sensor is switched by the collision detection device to the velocity measurement mode after recognition of the imminent collision.

2. The radar system of claim 1, wherein, in the normal operating mode, the radar sensor functions as an FMCW radar.

3. The radar system of claim 1, wherein, in the velocity measurement mode, the radar sensor functions as a Doppler radar.

4. The radar system of claim 1, wherein a measuring cycle of the radar sensor is shorter in the velocity measurement mode than in the normal operating mode.

5. The radar system of claim 1, wherein in a calculation module of the evaluation device, the distance from the vehicle to the object is extrapolated based on (i) distance values measured prior to the switch to the velocity measurement mode, and (ii) relative velocity values measured after the switch to the velocity measurement mode.

6. The radar system of claim 5, wherein the distance is extrapolated by integrating the extrapolation of measured relative velocities over time, and the expected time of collision is determined as corresponding to a time when the extrapolated distance is equal to zero.

7. The radar system of claim 6, wherein the precrash system activates a restraint system based on the expected time of collision and the expected impact velocity, which is an extrapolated value of relative velocity corresponding to the expected time of collision.

* * * * *